UNITED STATES PATENT OFFICE.

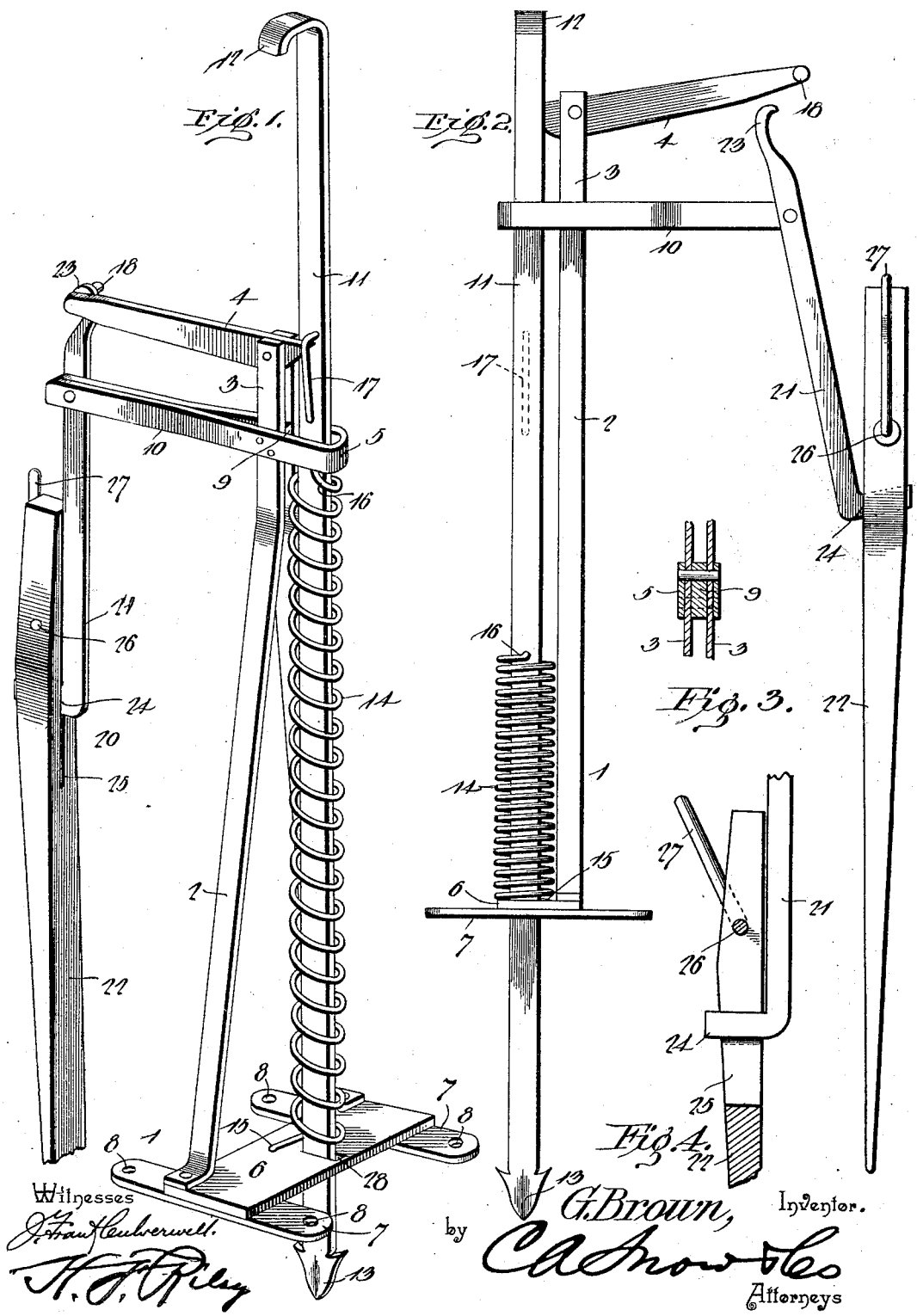

GEORGE BROWN, OF SANTIAM, OREGON.

ANIMAL-TRAP.

SPECIFICATION forming part of Letters Patent No. 695,905, dated March 25, 1902.

Application filed November 29, 1901. Serial No. 84,078. (No model.)

*To all whom it may concern:*

Be it known that I, GEORGE BROWN, a citizen of the United States, residing at Santiam, in the county of Linn and State of Oregon, have invented a new and useful Animal-Trap, of which the following is a specification.

The invention relates to improvements in animal-traps.

The object of the present invention is to improve the construction of animal-traps and to provide a simple, inexpensive, and efficient one designed more especially for gophers and moles and capable of being readily adjusted to position its parts properly at a mole-run or the like.

The invention consists in the construction and novel combination and arrangement of parts hereinafter fully described, illustrated in the accompanying drawings, and pointed out in the claims hereto appended.

In the drawings, Figure 1 is a perspective view of a trap constructed in accordance with this invention and illustrating the arrangement of parts when the trap is set. Fig. 2 is a side elevation, the trap being sprung. Fig. 3 is a detail sectional view of the upper portion of the supporting-frame. Fig. 4 is a similar view illustrating the construction of the upper portion of the lower section of the trigger.

Like numerals of reference designate corresponding parts in all the figures of the drawings.

1 designates a supporting-frame having a base and provided with upwardly-inclined sides or standards 2, secured at their lower ends to the base and having vertical upper portions 3, spaced apart to receive a lever 4 and arranged within a guide 5. The base consists of a transverse plate 6 and a pair of side plates or pieces 7, extending beyond the transverse plate and provided with openings 8, adapted to receive spikes or other suitable fastening devices for securing the supporting-frame in position. The upper portions 3 of the sides 2 are spaced apart by a block 9, and the guide which is secured to the upper portions of the sides consists of a bar or strip of metal doubled to form a loop and extended rearward to provide a supporting-arm 10. The loop extends in advance of the frame and receives a vertically-movable spring-actuated bar 11, having a handle or grip 12 at its upper end and provided with a spear-head 13 at its lower end. The spring-actuated bar is adapted to be set as hereinafter explained, and when the trap is sprung it is thrown downward forcibly by a coiled spring 14, and the animal springing the trap is impaled on its lower portion. The lower end 15 of the spring is secured to the transverse plate of the base, and the upper end 16 of the spring is secured to the bar 11, the plate 6 and the bar 11 being preferably perforated for the reception of the ends of the spring. The bar is provided between its ends with a loop 17, formed by a staple or rod and adapted to receive one end of the lever 4. The loop is formed by a substantially L-shaped piece having its terminals secured in perforations of the bar, and the lever, which is fulcrumed near one end between the upper portions of the sides of the frame, has a tapered end for engaging the loop, and its other end is provided with a laterally-extending arm or portion 18, which is engaged by the upper end of a trigger 20. The trigger 20 consists of upper and lower sections 21 and 22, the upper section being pivoted between its ends to the arm 10 and provided at its upper end with a hook 23 for engaging the laterally-extending arm or portion of the lever. The lower end of the section 21 is provided with an arm 24, arranged in a slot or kerf 25 of the lower section 22, which is preferably constructed of wood. The lower section, which is adapted to be arranged in different positions to set it properly with relation to the spring-actuated bar and the slot or kerf 25, which extends longitudinally of the upper portion of the section, forms two jaws which are connected by a screw 26, having a handle 27 and adapted to be readily rotated to clamp and release the upper section. When the trigger is in engagement with the outer portion or arm of the lever, as illustrated in Fig. 1 of the accompanying drawings, the lever will be held in engagement with the loop of the bar until the lower portion of the trigger is swung outward to carry the hook out of engagement with the lever. This will free the lever, which will thereby release the spring-actuated bar. The loop is tapering, as shown in Fig. 1, to prevent it from catching on the guide, through which it will readily pass.

It will be seen that the trap is exceedingly simple and inexpensive in construction, that it possesses great strength and durability, and that it may be readily set by lifting the spring-actuated bar. It will also be apparent that the trigger is capable of ready adjustment to lengthen and shorten it and to arrange its lower portion the desired distance from the spring-actuated bar and that the trap is exceedingly sensitive and will be sprung when the trigger is moved outward. Also the laterally-extending arm or portion of the lever is rounded and the hook is curved, so that but slight force will be required to spring the trap, and the sensitiveness of the same may be varied by adjusting the lower section of the trigger.

The lower portion of the spring-actuated bar is guided in a slot or opening 28 of the plate 6 of the base of the frame.

What I claim is—

1. A trap comprising a frame composed of a base having projecting side pieces and provided with upwardly-extending inclined sides spaced apart at their upper ends, a guide receiving the upper portions of the sides of the frame and having a forwardly-projecting loop, and provided with a rearwardly-extending arm, a spring-actuated bar passing through the guide, a lever fulcrumed between the sides of the frame and arranged to support the bar in an elevated position, and a trigger fulcrumed on the arm and engaging the lever, substantially as described.

2. A trap comprising a frame having a guide, a spring-actuated bar passing through the guide and provided with a tapering loop adapted to pass through the guide, a lever fulcrumed on the frame and engaging the loop, and a trigger mounted on the guide and engaging the lever, substantially as described.

3. A trap comprising a frame, a spring-actuated bar, a lever for supporting the bar in an elevated position, and a trigger engaging the lever and pivotally mounted and composed of an upper section having an arm, and a lower section provided with a longitudinal slot or kerf to receive the arm and having an adjusting device connecting the sides of the lower section, substantially as described.

4. A trap comprising a frame having an arm, a spring-actuated bar, a lever fulcrumed on the frame and arranged to support the bar in an elevated position and provided with a laterally-extending portion, and a trigger composed of an upper section fulcrumed on the arm and provided with a hook for engaging the laterally-extending portion of the lever, and a lower section adjustably secured to the upper section, substantially as described.

In testimony that I claim the foregoing as my own I have hereto affixed my signature in the presence of two witnesses.

GEORGE BROWN.

Witnesses:
    A. L. BROWN,
    A. B. BROWN.